No. 611,667. Patented Oct. 4, 1898.
H. B. & J. S. WATSON.
FEED WATER FILTER FOR STEAM BOILERS.
(Application filed Apr. 3, 1897.)

(No Model.) 4 Sheets—Sheet 1.

No. 611,667. Patented Oct. 4, 1898.
H. B. & J. S. WATSON.
FEED WATER FILTER FOR STEAM BOILERS.
(Application filed Apr. 3, 1897.)
(No Model.) 4 Sheets—Sheet 2.
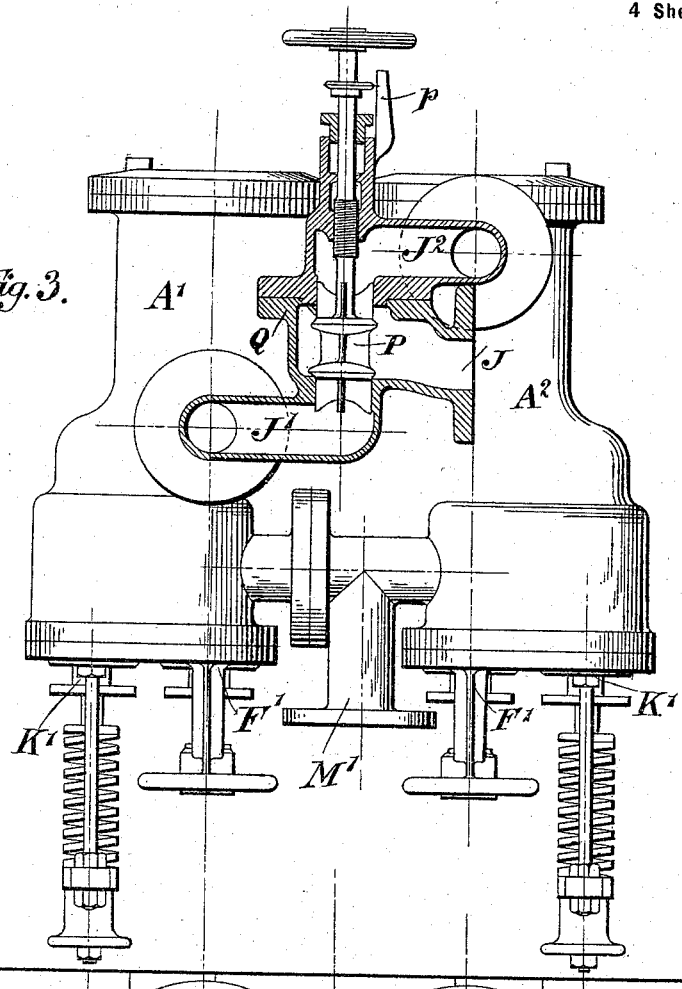
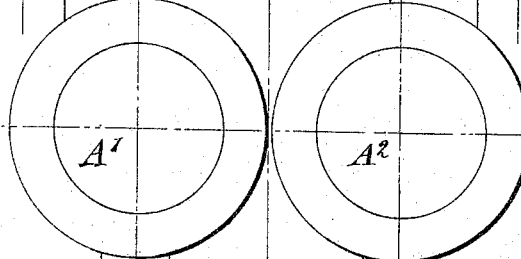
Witnesses:
Inventors:
Henry Burnett Watson
John Stanley Watson
By 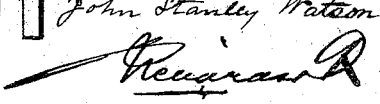
their Attorneys

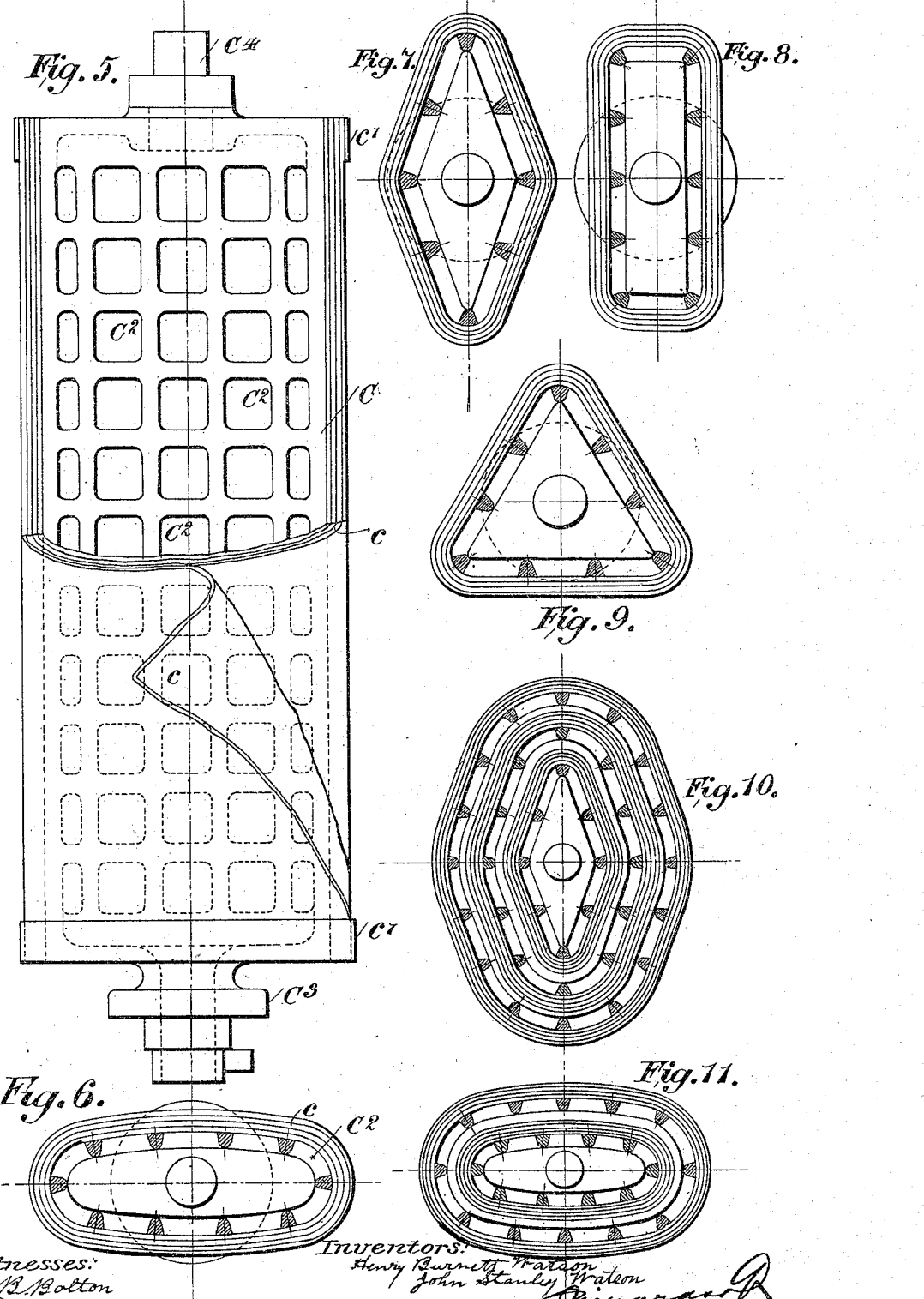

No. 611,667. Patented Oct. 4, 1898.
H. B. & J. S. WATSON.
FEED WATER FILTER FOR STEAM BOILERS.
(Application filed Apr. 3, 1897.)
(No Model.) 4 Sheets—Sheet 4.

Witnesses:
E. R. Bolton

Inventors:
Henry Burnett Watson
John Stanley Watson
By
their Attorneys

UNITED STATES PATENT OFFICE.

HENRY BURNETT WATSON AND JOHN STANLEY WATSON, OF NEWCASTLE-UPON-TYNE, ENGLAND.

FEED-WATER FILTER FOR STEAM-BOILERS.

SPECIFICATION forming part of Letters Patent No. 611,667, dated October 4, 1898.

Application filed April 3, 1897. Serial No. 630,648. (No model.)

*To all whom it may concern:*

Be it known that we, HENRY BURNETT WATSON, engineer, and JOHN STANLEY WATSON, engineer, citizens of Great Britain, residing at High Bridge Works, Newcastle-upon-Tyne, in the county of Northumberland, England, have invented certain new and useful Improvements in Feed-Water Filters Used in Connection with Steam-Boilers, of which the following is a specification.

Our invention relates to improvements in water-filters more especially applicable for filtering water for use in steam-generators, and has for its object to provide a relatively large aggregate filtering area within a casing of relatively small dimensions, and, further, to expeditiously effect the filtration and purification of water in large quantities without the necessity of frequent cleansing or renewal of the filtering material employed.

Our invention consists in the provision within the casing of a number of reticulated or perforated cases around which the filtering medium is wrapped of such a form or of such a number or of such a disposition as will provide a relatively large or a maximum filtering area, so that the internal area or dimensions of such component cases shall be relatively small or the minimum necessary for allowing the unrestricted passage of the percolating water therethrough, while the interstitial outer space may also be relatively small or the minimum necessary to insure the free access of the water to the surfaces of the filtering-cases.

Figure 1:
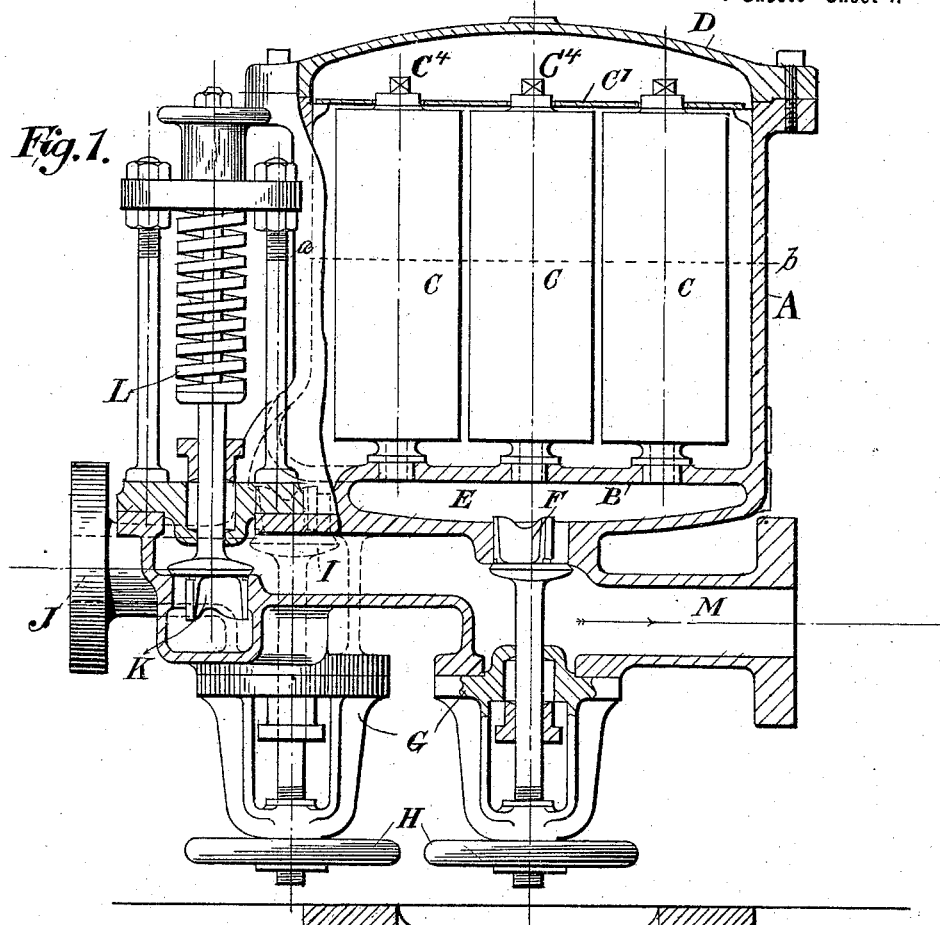
Figure 2:
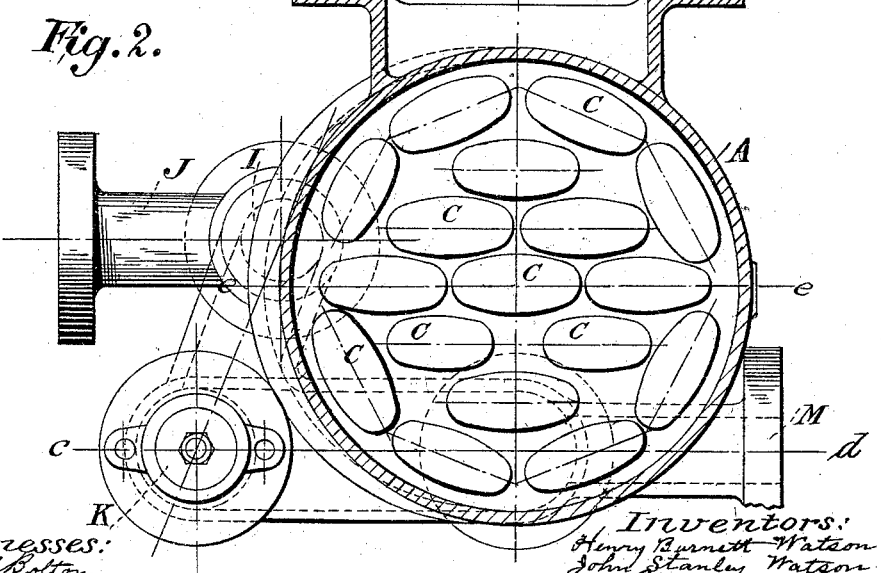
Figure 12:
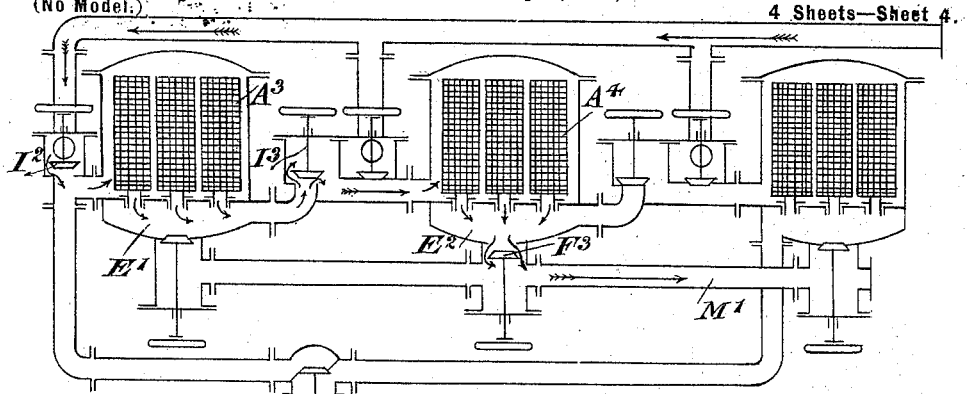
Figure 13:
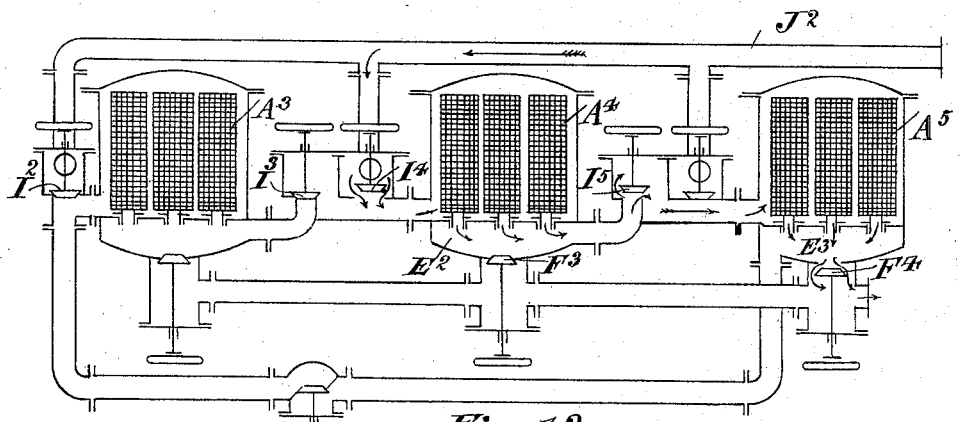
Figure 14:
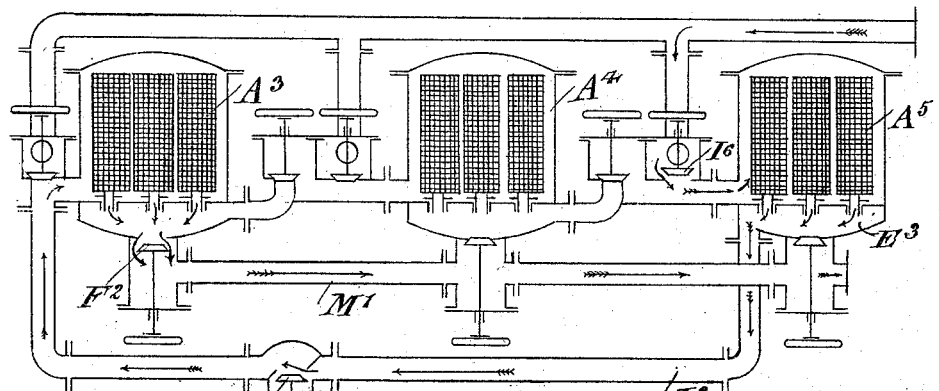

In the accompanying drawings, Figure 1 is an irregular section on lines $e\,f$ and $c\,d$ of Fig. 2, the upper portion of Fig. 1 being taken on the section-line $e\,f$ and the lower portion on the section-line $c\,d$. Fig. 2 is a sectional plan taken on line $a\,b$ of Fig. 1, the casing A and supporting-bracket only being shown in section. Fig. 3 is a modified duplex arrangement of filters in accordance with our invention, while Fig. 4 is a plan thereof. Fig. 5 illustrates in part sectional elevation an enlarged view of a filter case or frame, and Fig. 6 is a sectional plan thereof; Figs. 7 to 11, in sectional plan, different forms and sections of filtering cases or frames. Fig. 7 is a polygonal section. Fig. 8 is an oblong section. Fig. 9 is a triangular section. Fig. 10 is a polygonal treble section, while Fig. 11 is an oval double section. Figs. 12, 13, and 14 illustrate in diagrammatic sectional elevation an arrangement of three filters with valve connections arranged for duplex working.

In carrying our invention into effect we provide a casing A, preferably of circular sectional form, having a diaphragm or false bottom surface B, which may be cast or formed integral with casing A or independently and capable of removal. Upon this diaphragm B the filter cases or frames C are mounted, such cases being provided with a firm and tight seat upon the diaphragm and being capable of ready removal therefrom.

The filter-casing A is provided with a cover D, which is bolted thereto, and a removable cover C', which is set upon the protruding heads of the filter-cases C and holds the upper ends thereof in position.

An intermediate chamber E is provided in the casing A, and an outlet-valve aperture is centrally formed, through which a mushroom-valve F is seated, such valve, with its stem, being provided upon a bracket G, bolted to the casing, and being operated by a hand-wheel H. The inlet-valve I is provided, which, with its stem, is mounted upon a bracket G and operated by a hand-wheel H. The inlet-passage J is in communication with the under surface of the relief or by-pass valve K, which is loaded with a spring L of determined pressure, so that when the filtering material after an abnormal period of use becomes choked and offers considerable resistance to the passage of the unfiltered water the accumulation of a great pressure is obviated by means of such relief-valve K, which immediately upon such determined pressure being exceeded is uplifted and the water passes through the outlet M direct to the boiler.

The filter cases or frames C are provided with closed upper ends and with apertures or perforations $C^2$ around their peripheral surfaces upon which the filtering flannel or material $c$ may be wrapped and after wrapping be clipped and retained upon the cases or frames by means of clips, straps, or bands $c'$, disposed at each end of the cases or intermediate thereof or otherwise, as may be necessary.

The lower extremity of each of the cases is provided with a boss $C^3$, upon which the case rests and whose extremity fits and is retained within the seat provided in the diaphragm B by any suitable means, while the upper extremity of each of the cases is provided with a screwed plug $C^4$.

The filter may be held to the wall by a suitable holder or bracket $A^3$, Fig. 2.

The action of the filter is as follows: The inlet-valve I and the outlet-valve F are opened and the unfiltered water from the feed-pump enters the casing A and surrounds the cases C, percolating through the filtering material wrapped thereupon and passing internally into the cases and into the intermediate chamber E, where the filtered water passes through the common valve-aperture to the outlet M and thence to the boiler, as indicated by the arrows.

When it is desired to cleanse the filter in a case where only one is employed, the inlet-valve I and the outlet-valve F are closed and the by-pass valve K is opened, thus permitting the feed-water to pass direct through the outlet M to the boiler without filtration.

When the filtering medium employed has become saturated to such an extent as to be substantially unaffected by cleansing in this way, the cases are removed and new material is placed thereupon, and for this purpose the cover D is removed and each case removed singly, and if an independent diaphragm is employed that, together with the cases mounted thereupon, is entirely removed for this repair.

Figs. 3 and 4 show in elevation and plan a duplex arrangement of filters substantially the same in construction as that illustrated in Figs. 1 and 2. A change-valve P is here shown for diverting the unfiltered water from the feed-pump to one of the filters when the other is required to be cleansed. The common inlet J is shown and the duplex change-valve P works upon opposing seats within the valve-casing Q.

When it is desired to divert the water from the filter $A'$ to the filter $A^2$, the duplex valve is screwed down to the lower seat and the supply cut off from the inlet $J'$ of the filter $A'$, while the upper part of the valve is opened and the feed-water issues through the inlet-passage $J^2$ to the filter $A^2$. It will be seen that by means of this arrangement it is possible to filter continuously, the periodic isolation of the one filter allowing for regular cleansing while the other is in operation.

A suitable indicator $p$ is employed to show the position of the valve. The filtered water issues in each case to a common outlet $M'$, and independent outlet-valves $F'$ are employed, as also independent by-pass or relief valves $K'$. The operation of the duplex filter is substantially the same as the single filter hereinbefore described.

Figs. 12, 13, and 14 illustrate a system of continuous filtration in which three filters are employed for duplex working, the filters in each case being arranged and operating substantially as hereinbefore described and being used in continuous succession. The filters $A^3$ and $A^4$ are shown in Fig. 12 as being in use, the filter $A^3$ being the primary filter, while the filter $A^4$ is the secondary filter. The feed-water passes from the pump through the inlet-pipe $J^3$, through the inlet-valve $I^2$, through the filter $A^3$, thence to the intermediate chamber $E'$, through the valve $I^3$ to the filter $A^4$, into the intermediate chamber $E^2$ to the valve $F^3$, and thence through the outlet-pipe $M'$ to the boiler. After a determined period of filtration the inlet-valve $I^4$ is opened and the inlet-valve $I^2$ and communication-valve $I^3$ closed and the feed-water passes from the inlet-pipe $J^2$ direct to the filter $A^4$. The outlet-valve $F^3$ is closed, so that the water after passing into the intermediate chamber $E^2$ passes through the communication-valve $I^5$, which is previously opened, through to the filter $A^5$ into the intermediate chamber $E^3$, and thence through the outlet-valve $F^4$ direct to the boiler. The filter $A^3$ is meanwhile cleansed, and after a further determined period of filtration the filter $A^4$ is cut off and the feed-water passes through the valve $I^6$ direct to the filter $A^5$, into the intermediate chamber $E^3$, thence through the communicating-pipe $J^3$ and communicating-valve $I^7$ to the filter $A^3$, passing to its intermediate chamber through the outlet-valve $F^2$, and thence through the outlet-pipe $M'$ to the boiler.

Figs. 12, 13, and 14 show the cycle of operations, the valves being shown closed or open, as required, and the direction of the feed-water in each figure indicated by arrows.

It will be understood that two filters are continuously employed, while the other is cut out of circuit and cleansed, ready to be used as the secondary filter when the primary filter becomes surcharged, and after a period of use as a secondary filter the feed-water is passed direct therethrough and the filter acts as a primary filter, while the other filter previously cut out of circuit and cleansed is used as a secondary filter, and so on.

We do not limit our invention to the specific instances of construction and arrangement hereinbefore described, as we may employ the essential features of our invention as hereinbefore described in any modification of design to suit particular requirements.

It is obvious that the course of the feed-water may be reversed and any necessary or desirable modification made in the arrangement of construction to adapt the filter for filtration of the water from the interior to the exterior of the filtering-cases without departing from the essential features of our invention.

Having now described our invention, what we claim as new, and desire to secure by Letters Patent, is—

1. In a filtering apparatus, a chamber A, having a diaphragm B forming upper and lower compartments, a series of reticulated cases or frames seated upon said diaphragm and having their interiors communicating with the lower compartment, an inlet-passage communicating with the upper compartment, an outlet-passage communicating with the lower compartment and a relief-valve in communication with the inlet-passage, substantially as described.

2. In combination, the chamber A having a diaphragm B forming upper and lower compartments, the series of reticulated frames having necks seated in openings in the diaphragm, filtering material surrounding said frames, heads protruding from the upper ends of said frames, a removable cover or plate C' having openings to engage and guide said heads, an inlet to the upper compartment, an outlet from the lower, with valves controlling said inlet and outlet and a relief-valve connecting said inlet directly with the outlet, substantially as described.

In witness whereof we have hereunto set our hands in presence of two witnesses.

HENRY BURNETT WATSON.
JOHN STANLEY WATSON.

Witnesses:
TORBEN CHRISTIAN BILLETOP,
THOMAS WARALE HESLOP.